United States Patent [19]
Giandalia et al.

[11] Patent Number: 4,997,323
[45] Date of Patent: Mar. 5, 1991

[54] EDGE FINISHED RESILIENT TILE, METHOD AND APPARATUS

[75] Inventors: Joseph L. Giandalia, Lancaster; Darryl L. Sensenig, Mountville, both of Pa.

[73] Assignee: Armstrong World Industries, Inc., Lancaster, Pa.

[21] Appl. No.: 369,711

[22] Filed: Jun. 22, 1989

[51] Int. Cl.$^5$ ............................................. B23C 3/12
[52] U.S. Cl. .................................. 409/132; 52/390; 83/419; 83/435.2; 83/869; 144/117 B; 144/134 R; 409/138; 409/218; 198/836.1
[58] Field of Search ............... 409/131, 132, 138, 174, 409/218, 303; 52/390; 83/435.2, 419, 420, 422, 869; 144/117 B, 134 R, 245 A, 253 A, 253 F, 253 J; 198/456, 836, 836.1, 836.3

[56] References Cited

U.S. PATENT DOCUMENTS

| | | | |
|---|---|---|---|
| 2,730,144 | 1/1956 | Joa | 144/245 A |
| 3,182,560 | 5/1965 | Wonder et al. | 409/138 |
| 3,927,706 | 12/1975 | Davey | 144/253 F X |

OTHER PUBLICATIONS

VPI Product Bulletin MK-2020-0983R entitled "VPI Conductile ® Static-conductive vinyl flooring", Vinyl Plastics, Inc., Sheboygan, Wis. (1983).
ASTM Standard F540-79 (Reapproved 1985), American Society for Testing and Materials, Philadelphia, Pa.

*Primary Examiner*—Steven C. Bishop

[57] ABSTRACT

Resilient tile within 0.005 inches of square and having sides within 0.005 inches of each other may be produced by positioning unfinished tile on a continuous belt. One edge adjacent the trailing edge of each tile is made to contact a stop means while the trailing edge is made to contact two independently adjustable dogs on the continuous belt. The tile is held down by hold-down rollers while the tile is so positioned. The two edges adjacent the trailing edge are edge finished, preferably by two cylindrical shaper routers. The tile is then positioned on a second continuous belt with one of the finished edges becoming the trailing edge and the remaining two edges being edge finished.

22 Claims, 2 Drawing Sheets

EDGE FINISHED RESILIENT TILE, METHOD AND APPARATUS

FIELD OF THE INVENTION

The present invention is directed to an edge finished resilient tile, and a method and apparatus for producing the tile. In particular, the invention is directed to an edge finished resilient tile which has superior squareness and uniformity of size within each lot and from lot to lot. Due to the superior squareness and uniformity of size, a surface covering can be easily laid in which the tile edges are substantially indiscernible.

BACKGROUND OF THE INVENTION

Resilient tile, particularly vinyl composition tile and vinyl tile, are typically produced by die cutting the individual tiles from a continuous sheet. The punch press which die cuts the tile, actually punches out the tile from the continuous sheet by tearing the tile composition under a blade. Therefore, rather than having a smooth cut edge, the tile edges are jagged.

Further, the squareness of the tile is dependent on the squareness of the punch as well as the straightness of the die cut edges. The unevenness of the edges is exacerbated if the tile is coated, particularly with a curtain coater, after being die cut.

These nonuniformities and unsquareness lead to unsightly seams when the individual tiles are laid up as a surface covering. These seams are typically about 0.010 inches wide and are readily discernible from distances of three feet or greater.

To overcome these disadvantages, some tile have been edge-finished by sanding or otherwise finishing the edges of a stack of tiles. However, such methods have not addressed the problem of accurately positioning the tiles in the stack or accurately aligning each stack. Therefore, While this method has improved the squareness and uniformity of the tiles, the seams of most prior art tile floors are still readily discernible.

SUMMARY OF THE INVENTION

It is an object of the invention to provide an apparatus and method for consistently producing an edge-finished resilient tile which has a squareness of within 0.005 inches and edge lengths within 0.005 inches of each other. Such tile can be laid up as a surface covering which has seams which are substantially indiscernible at a distance.

It is another object to provide an apparatus and method for producing such edge finished tile at a rate of at least 10,000 tiles per hour. To achieve such an object, is the further object to provide an apparatus and method which allows the simultaneous edge finishing of a plurality of tiles.

The foregoing objects can be accomplished by positioning the tile to be edge finished on a continuous belt by contacting the tile edges with three reference points, maintaining the position with hold down means and moving the held down tile past an edge finishing means such as a cylindrical shaper router having the axis of rotation perpendicular to the plane of the tile.

DETAILED DESCRIPTION

As previously discussed, most resilient tile is presently die cut and installed without edge finishing the tile. While some tile is edge finished by sanding the edges with a belt sander, this method is slow and does not produce adequately square and uniform tile.

Resilient tile is presently die cut oversized. This is because after the die cut tile is coated with a wear layer and processed to adhere the wear layer to the tile, it shrinks. The amount of shrinkage depends upon such variables as the starting materials, uniformity of the tile composition in laying up the continuous sheet from which the tiles are die cut, and the processing temperatures and pressures. Therefore, in addition to the previously discussed problems of squareness and edge straightness, it has been difficult to obtain tile of uniform size.

As a result of the non-uniform size, squareness, edge roughness and edge straightness, surface coverings which are laid up with the tile of the prior art yield seams which are readily visible. Some manufacturers have addressed these problems by forming a stack of finished tile and sanding or otherwise finishing the edges. However, not only is this process time consuming and expensive, means have not been developed to accurately position the individual tiles in the stack or the stack with relation to the sander to obtain uniformly sized and square tile.

Figure 1:
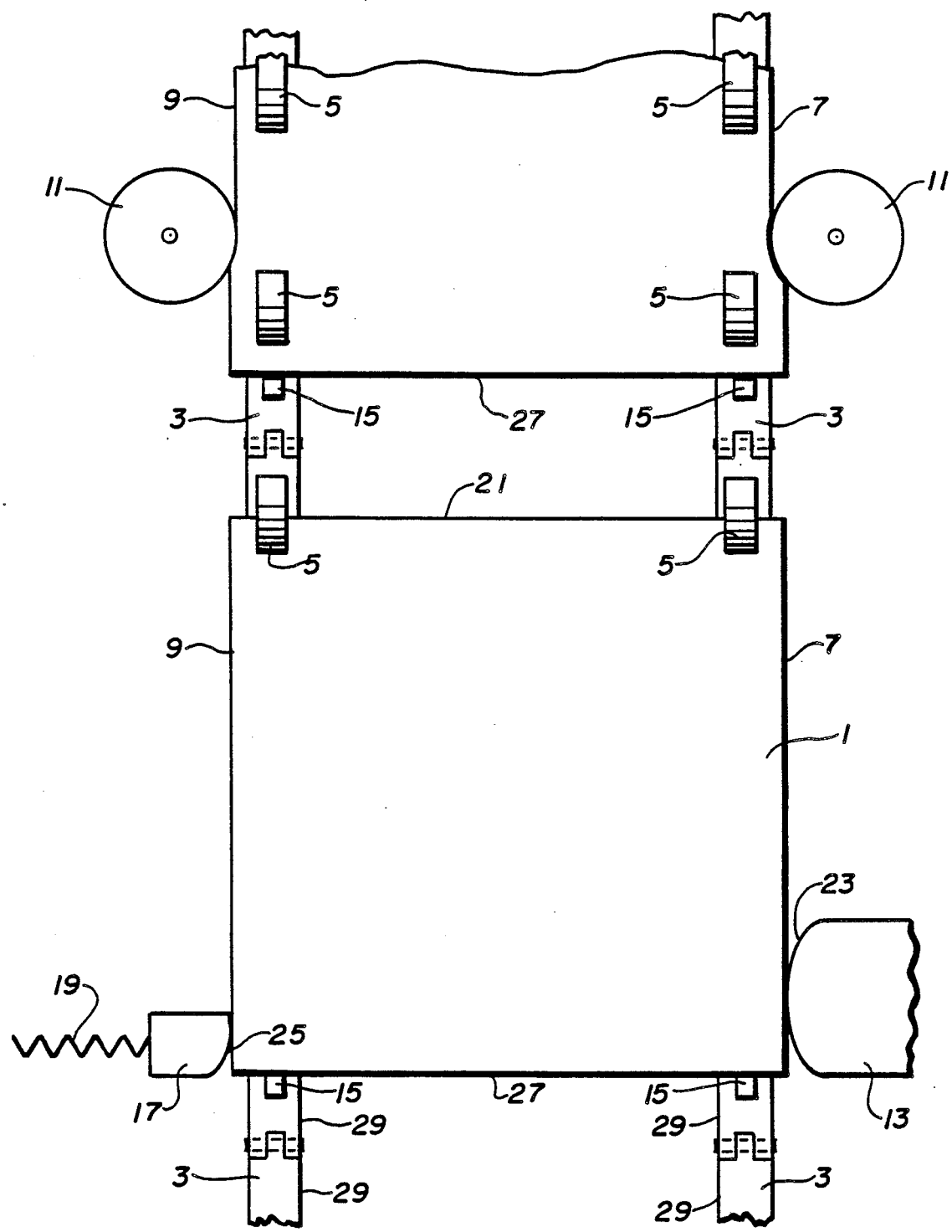
FIG. 1 is a schematic representation, in plan, of apparatus to edge finish resilient tile in accordance with the present invention.

Tile which is within 0.005 inches of square as determined by ASTM Standard F540 and edges of length within 0.005 inches of a desired length have been obtained using the apparatus shown schematically in FIG. 1. The unfinished tile 1 is positioned on the continuous belt 3, held down by hold down rollers 5 and opposite edges 7 and 9 finished with routers 11. The tile 1 is accurately positioned on the continuous belt 8 by a stop means 13, dogs 15 and pusher means 17. The pusher means 17 is located generally opposite the stop means 13 and is spring loaded with a spring 19. The spring 19 has sufficient force to push the tile into contact with the stop means 13 and creates sufficient drag on the tile i to maintain the tile in contact with the dogs 15.

It is important that, as the edges 7 and 9 initially contact the stop means 13 and pusher means 17, the tile 1 be free to move relative to the continuous belt 3. As shown in FIG. 1, the contacting surfaces 23 of stop means 13 and 25 of pusher means 17 are convex to assist in positioning the tile 1. The preferred radius of curvature for the contacting surface 23 is found to be six inches for 9"×9" tile and 12"×12" tile. Preferably, the point of contact of surface 25 with edge 9 is at the trailing edge of surface 25. It has also been found desirable to have the point of contact of the pusher means 17 be slightly upstream from the point of contact of the stop means 13.

As shown in FIG. 1, before the trailing edge 27 passes the stop means 13 and pusher means 17, the leading edge 21 is contacted by the first set of hold-down rollers 6. Preferably, the first set of hold-down rollers are positioned to contact the leading edge 21 when the point of contact of the pusher means 17 is about ½ inch from disengaging the edge 9 and the point of contact of the stop means 13 is about ¾ inch from disengaging the edge 7. To maintain the accurate positioning of the tile established by the dogs 15, stop means 13 and pusher means 17, it is important that the hold down rollers 5 have minimum play and exert sufficient pressure on the tile 1 to clamp the tile 1 to the continuous belt 3.

Figure 2:
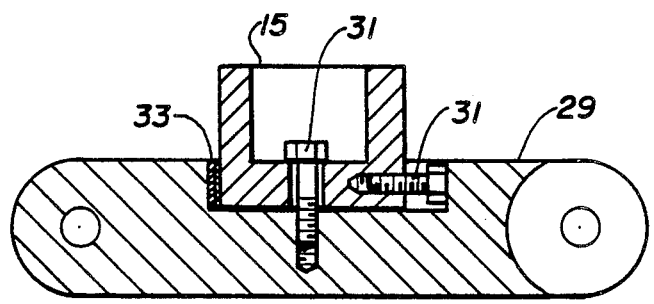
FIG. 2 is a schematic representation, in side elevation, of a link of the continuous belt of the apparatus of FIG. 1.

To compensate for variabilities in the length of the links 29 forming the continuous belt 3 and accurately position the tile 1 perpendicular to the direction of travel, the dogs 15 must be adjustable. A preferred embodiment is shown in FIG. 2. The dog 15 is secured to the link 29 by screws 31. The dog 15 is adjusted relative to link 29 by inserting or removing shims 33.

The ability to adjust the dogs 15 is particularly important during the second edge finishing step. After the two edges 7, 9 adjacent the trailing edge 27 are edge finished as shown in FIG. 1, the tile 1 is positioned on a second continuous belt with one of the finished edges 7, 9 becoming the trailing edge. The squareness of the finished tile is obtained by adjusting the dogs 15 to maintain the trailing edge perpendicular to the direction of travel.

Figure 3:
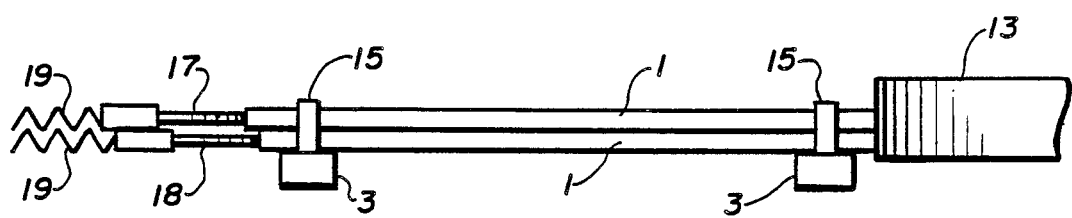
FIG. 3 is a schematic representation, in elevation, of the apparatus of FIG. 1.

Processing of the tiles can be increased by edge finishing a plurality of tiles simultaneously as shown in FIG. 3. To obtain the precise squareness and sizing obtained by the present invention, the individual tiles must be positioned on the conveyor belt 3 with each trailing edge in contact with both dogs 15 and with one edge adjacent to the trailing edge in contact with the stop means 13. This is accomplished by having independent spring loaded pusher means 17 and 18 contacting the individual tiles at the edge opposite the stop means 13. If a single pusher means contacted a plurality of the tiles, there is no assurance that each tile would be in contact with the stop means 13. In fact, it is most likely that the widest tile would contact the stop means while the remaining tile or tiles would only contact the two dogs and pusher means.

By using the above described apparatus, runs in excess of 20,000 resilient tile have been produced in which each tile is well within 0.005 inches of square and have sides of length well within 0.005 inches of each other. It is anticipated that runs in excess of 250,000 tiles with the specified squareness and size can be easily achieved when the process is utilized in a commercial production line. No known commercial tiles, particularly 9"×9" or 12"×12" tiles, have such consistent squareness and uniformity.

What is claimed is:

1. A method of edge finishing tile comprising aligning the unfinished tiles during the edge finishing step and edge finishing the aligned tile, wherein the alignment is obtained by contacting the tile edges of each tile with only three reference points.

2. The method of claim 1 wherein the tile has a trailing edge and two of the three reference points contact the trailing edge and the third reference point contacts an edge adjacent the trailing edge.

3. The method of claim 2 wherein contact with the reference points is obtained by a single spring loaded pusher contacting the tile edge opposite the third reference point.

4. The method of claim 1 wherein the trailing edge of the unfinished tiles are aligned-perpendicular to the direction of travel of a continuous belt on which the tiles ride.

5. The method of claim 4 wherein the tile has a trailing edge and two of the three reference points contact the trailing edge and the third reference point contacts an edge adjacent the trailing edge to align the tile, the two reference points contacting the trailing edge being dogs secured to the continuous belt.

6. The method of claim 5 wherein the dogs are in pairs and have contacting surfaces which contact the trailing edge and adjustable limit means which positions the contacting surface of at least one of each pair of dogs in the machine direction relative to the continuous belt.

7. The method of claim 6 wherein the contacting surfaces of each pair of dogs are aligned to be within 0.005" of perpendicular to the machine direction.

8. The method of claim 5 wherein the edges of the tile adjacent the trailing edge are edge finished and the tile is then aligned with the direction of a second continuous belt, one of the finished edges becoming the trailing edge and contacting two reference points of the second continuous belt.

9. The method of claim 5 wherein the tile rides on the continuous belt free of hold-downs while contacting the three reference points and a single spring-loaded pusher contacts the tile edge opposite the third reference point.

10. The method of claim 9 wherein the leading edge of the tile contacts a hold-down roller while the third reference point and pusher contact the tile only near the trailing edge.

11. A tile made by the method of claim 1.

12. A plurality of resilient tiles made by the method of claim 1 wherein the tiles form a stack of tiles, each tile in the stack being within 0.005" of square.

13. A plurality of resilient tiles made by the method of claim 1 wherein the tiles form a stack of tiles, each edge of each tile in the stack being within 0.005" of the other edges.

14. The method of claim 1 wherein a plurality of tiles are edge finished simultaneously, the edges of each tile contacting the three reference points.

15. A method of simultaneously edge finishing a plurality of tiles comprising positioning a first unfinished tile above a second unfinished tile, aligning the unfinished tiles by contacting the tile edges of each tile with three reference points during the edge finishing step and edge finishing the aligned tiles, wherein the trailing edge of each of the first and second tile contacts two of the three reference points and an edge of the first and second tile adjacent its trailing edge contacts the third reference point, and wherein contact with the reference points is obtained by independent spring loaded pushers contacting the tile edge of the first and second tile opposite the third reference point.

16. A plurality of resilient tiles forming a stack of tiles wherein each tile has edges routed with a cylindrical shaper cutter, the edges are each tile being within 0.005" of square.

17. The plurality of resilient tiles of claim 16 wherein each edge is within 0.005" of the other edge.

18. An apparatus for making tile comprising a continuous belt, hold-down means, edge finishing means, a stop means, and a pusher means; the direction of travel of said continuous belt defining a machine direction; said continuous belt having a plurality of dogs with contacting surfaces and adjustable limit means which position the contacting surfaces in the machine direction relative to the continuous belt; said stop means and said pusher means being on opposite sides of said continuous belt; said edge finishing means being on at least one side of said continuous belt and in the machine direction from said stop means; said hold-down means being between said stop means and pusher means and said edge finishing means.

19. The apparatus of claim 18 wherein the stop means has a contacting surface which contacts an edge of the tiles being edge finished, the contacting surface being convex.

20. The apparatus of claim 19 wherein the pusher means has a contacting surface which contacts the edge of the tile opposite the tile edge contacted by the stop means, the pusher means contacting surface being convex.

21. The apparatus of claim 20 wherein the pusher means contacting surface is arranged so as to contact only one tile edge at any time.

22. The apparatus of claim 18 wherein the stop means and the pusher means contact opposite edges of the tiles being edge finished, the point of contact of the stop means being in the machine direction from the point of contact of the pusher means.

* * * * *